United States Patent [19]

Koike

[11] Patent Number: 4,735,177

[45] Date of Patent: Apr. 5, 1988

[54] INTAKE SYSTEM FOR INTERNAL COMBUSTION ENGINE

[75] Inventor: Masamitsu Koike, Hiroshima, Japan

[73] Assignee: Mazda Motor Corporation, Japan

[21] Appl. No.: 905,659

[22] Filed: Sep. 11, 1986

[30] Foreign Application Priority Data

Sep. 13, 1985 [JP] Japan .................. 60-204136

[51] Int. Cl.$^4$ ............................ F02B 75/18
[52] U.S. Cl. .................... 123/52 M; 123/52 MC
[58] Field of Search ......... 123/52 M, 52 MC, 52 MB, 123/52 MV, 52 ML

[56] References Cited

U.S. PATENT DOCUMENTS

| 3,814,069 | 6/1974 | Croft et al. ............ 123/52 M |
| 4,590,895 | 5/1986 | Yada et al. ............ 123/52 MB |
| 4,599,977 | 7/1986 | Materazzi ............. 123/52 M |

FOREIGN PATENT DOCUMENTS

| 53-4007 | 1/1978 | Japan . | |
| 0137516 | 10/1979 | Japan ............ | 123/52 MB |
| 56-115819 | 9/1981 | Japan . | |
| 0052651 | 3/1982 | Japan ............ | 123/52 MB |
| 0126028 | 7/1984 | Japan ............ | 123/52 MB |
| 60-164619 | 8/1985 | Japan . | |

2136501 9/1984 United Kingdom ......... 123/52 MB

Primary Examiner—Charles J. Myhre
Assistant Examiner—David A. Okonsky
Attorney, Agent, or Firm—Gerald J. Ferguson, Jr.; Michael P. Hoffman; Michael J. Foycik, Jr.

[57] ABSTRACT

An intake system for an internal combustion engine has an intake passage comprising a common passage portion opening to the atmosphere, a surge tank connected to the downstream end of the common passage portion and a plurality of discrete passage portions branching from the surge tank and respectively connected to the cylinders. At least one interconnecting passage is provided to communicate each of the discrete passage portions with at least one of the other discrete passage portions at a portion downstream of the surge tank, and an on-off valve is disposed at each junction of the interconnecting passage with the discrete passage portions to open and close each junction. The on-off valve is opened when the engine speed exceeds a predetermined speed. The effective cross-sectional area of the each discrete passage portion is smaller in the portion upstream of the junction of the discrete passage portion with the interconnecting passage when in the portion downstream of the same.

8 Claims, 4 Drawing Sheets

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for an internal combustion engine in which the engine output power is improved by the kinetic effect of intake air.

2. Description of the Prior Art

As is well known, a negative pressure wave generated in an intake system of an internal combustion engine upon the initiation of each intake stroke is propagated upstream of the intake system and is then reflected at an end of the system opening to the atmosphere or to a surge tank disposed on an upstream side of the intake system toward the intake port as a positive pressure wave. By arranging the intake system so that the positive pressure wave reaches the intake port immediately before closure of the intake valve to force intake air into the combustion chamber, the volumetric efficiency can be improved. There have been known various intake systems in which such inertia effect or resonance effect of intake air is used for improving the volumetric efficiency. However, the period of oscillation of the pressure wave in the intake passage can be matched with the period of opening and closure of the intake valve to obtain a sufficient inertia effect of the intake air only within a limited engine speed range which depends upon the shape of the intake passage. There has been proposed an intake system in which, for instance, the length of the intake passage is changed according to the engine speed in order to obtain an inertia effect of intake air over a wider engine speed range. For example, in the intake system disclosed in Japanese Unexamined patent publication No. 56(1981)-115819, each of the discrete intake passage portions leading to the respective combustion chambers is bifurcated to form a long passage portion and a short passage portion both opening to a surge tank or the like at the upstream end, and an on-off valve is provided in the short passage portion to open the short passage portion in the high engine speed range to shorten the effective length of the discrete intake passage portion, thereby obtaining a sufficient inertia effect of intake air in the high engine speed range in addition to a low engine speed range. (See FIG. 6 of the Japanese unexamined patent publication described above.)

In the intake system described above, the volumetric efficiency for one cylinder is improved by the inertia effect of intake air generated by pressure propagation only in the discrete intake passage portion leading to the cylinder. If the pressure propagation in the discrete intake passages leading to other cylinders can be effectively utilized, the volumetric efficiency will be further improved.

Thus, we have proposed in Japanese Unexamined patent publication No. 59(1984)-275487 an intake system for a multicylinder internal combustion engine in which the inertia effect of intake air can be effectively utilized to improve the volumetric efficiency in both the low engine speed range and the high engine speed range, and at the same time, the inertia effect of intake air in each discrete intake passage portion can be enhanced by the pressure wave in at least one of the other discrete intake passage portions especially in high engine speed ranges. The intake system has an intake passage comprising a common passage portion opening to the atmosphere, a surge tank connected to the downstream end of the common passage portion and a plurality of discrete passage portions branching from the surge tank and respectively connected to the cylinders. At least one interconnecting passage is provided to communicate each of the discrete passage portions with at least one of the other discrete passage portions at a portion downstream of the surge tank, and an on-off valve is disposed at each junction of the interconnecting passage with the discrete passage portions to open and close each junction. The on-off valve is opened at least when the engine speed exceeds a predetermined value.

In order to further improve the volumetric efficiency in the intake system of the type described above, it is preferred that the effective cross-sectional area of the intake passage be narrowed to increase flow speed of intake air in the low engine speed range in which the amount of intake air is relatively small. Generally, the volumetric efficiency is affected also by flow speed of intake air and intake resistance, and it has been known that the best kinetic effect of intake air can be enjoyed when the flow speed of intake is approximately 60 m/sec. On the other hand, if the effective cross-sectional area of the intake passage is excessively small in the high engine speed range in which the amount of intake air is relatively large, the intake resistance is increased to lower the volumetric efficiency. Our investigation on the relation between the flow speed of intake air and the intake resistance has revealed that the flow speed of intake air at engine speeds near the engine speed corresponding to the maximum horsepower is preferably not higher than 100 m/sec.

SUMMARY OF THE INVENTION

In view of the foregoing observations and description, the primary object of the present invention is to provide an intake system in which the inertia effect of intake air in each discrete intake passage portion can be enhanced by the pressure wave in at least one of the other discrete intake passage portions and, at the same time, the flow speed of intake air is increased in the low engine speed range and the intake resistance is reduced in the high engine speed range so that optimal volumetric efficiency can be obtained over a wide engine speed range.

The intake system in accordance with the present invention comprises an intake passage including a common passage portion opening to the atmosphere, a surge tank connected to the downstream end of the common passage portion and a plurality of discrete passage portions branching from the surge tank and respectively connected to the cylinders; and at least one interconnecting passage which is provided to communicate each of the discrete passage portions with at least one of the other discrete passage portions at a portion downstream of the surge tank and is provided with a control means which closes the interconnecting passage in a low engine speed range and opens the same in a high engine speed range, the effective cross-sectional area of the each discrete passage portion being smaller in the portion upstream of the junction of the discrete passage portion with the interconnecting passage than in the portion downstream of the same.

In the intake system of the present invention, the flow speed of intake air is increased by virtue of the narrow portion of the discrete intake passage portion upstream of the junction in the low engine speed range in which the interconnecting passage is closed and intake air is introduced solely through the discrete intake passage portion, whereby the kinetic effect of intake air is enhanced. On the other hand, in the high engine speed range in which the interconnecting passage is opened and intake air is introduced through both the discrete intake passage portion corresponding to the cylinder in the intake stroke and the other discrete intake passage portions connected to the discrete intake passage portion by way of the interconnecting passage, the influence of the narrow portion of the discrete intake passage portion on the intake resistance is canceled and high volumetric efficiency can be obtained.

DESCRIPTION OF THE PREFERRED EMBODIMENT

Figure 1:
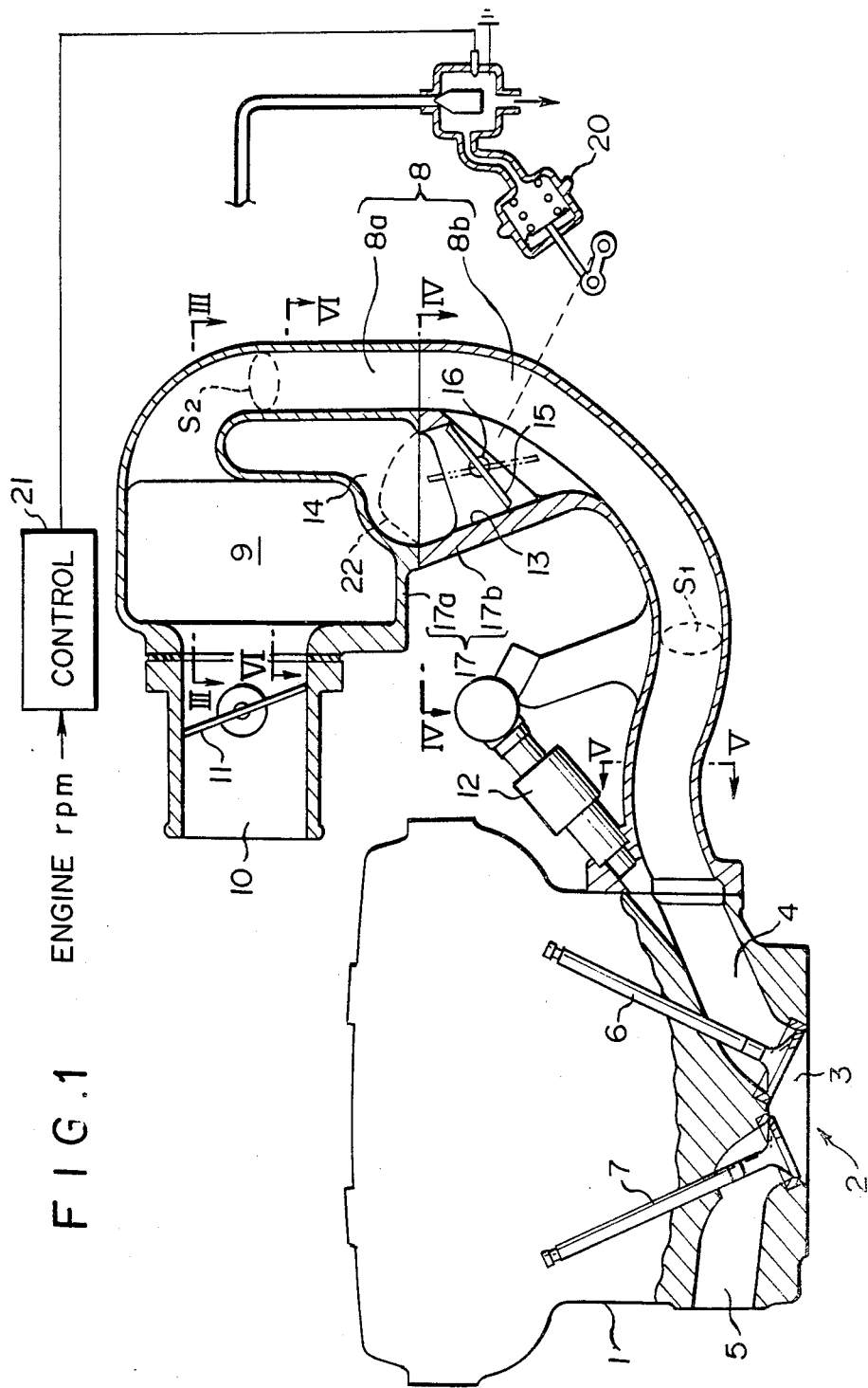
FIG. 1 is a schematic cross-sectional view of an engine provided with an intake system in accordance with an embodiment of the present invention.
Figure 2:
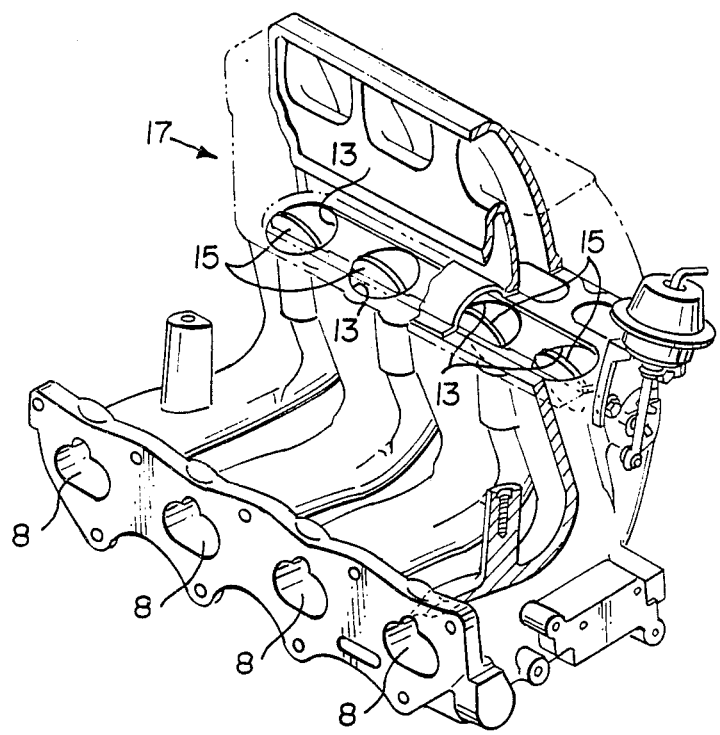
FIG. 2 is a perspective view partly broken away of an intake manifold of the engine shown in FIG. 1.
Figure 3:
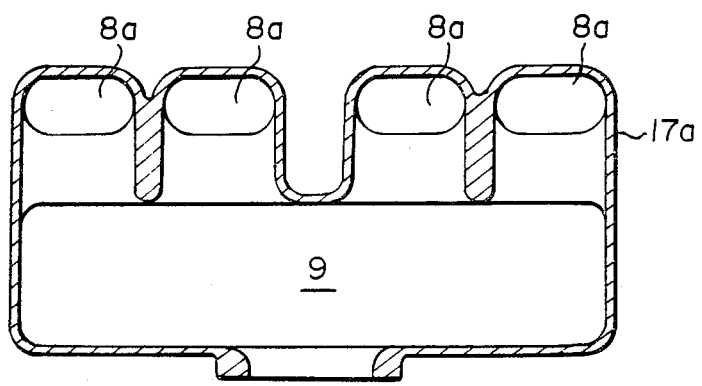
FIG. 3 is a cross-sectional view taken along line III—III in FIG. 1.
Figure 4:
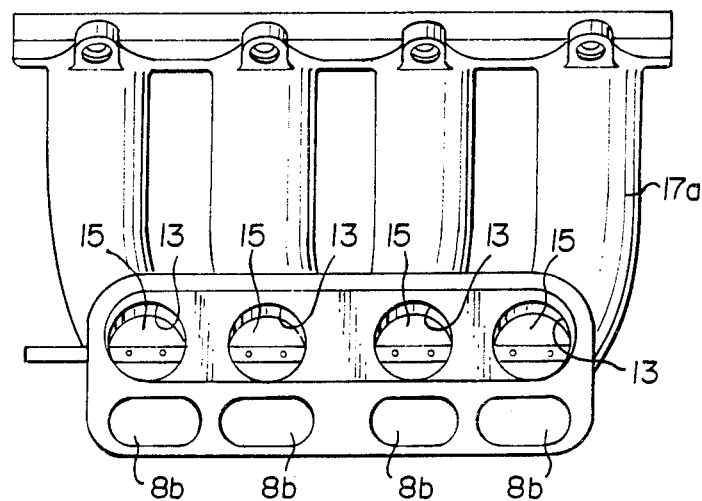
FIG. 4 is a schematic plan view along line IV—IV in FIG. 1.
Figure 5:
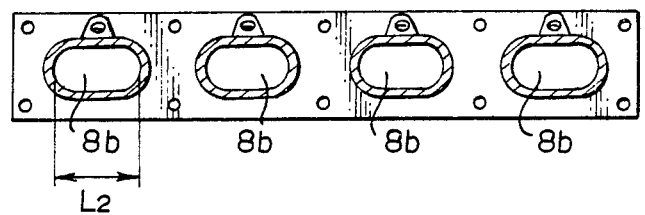
FIG. 5 is a cross-sectional view taken along line V—V in FIG. 1.
Figure 6:
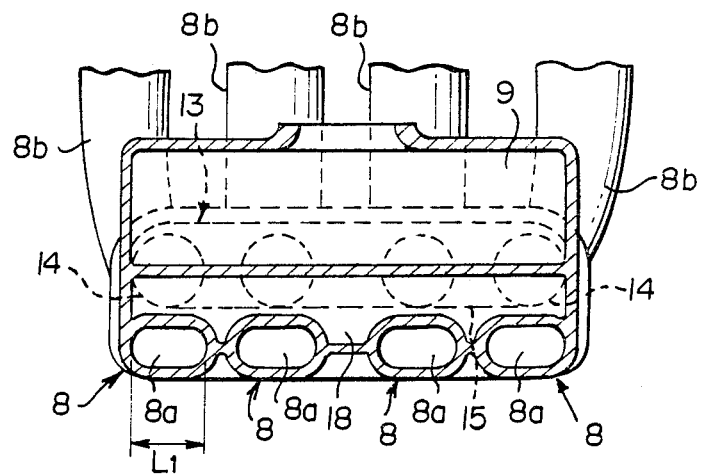
FIG. 6 is a cross-sectional view taken along line VI—VI in FIG. 1.

In FIG. 1, a four-cylinder engine provided with an intake system in accordance with an embodiment of the present invention comprises an engine body 1 having first to fourth cylinders 2 arranged in line. In each cylinder 2, a combustion chamber 3 is defined above a piston (not shown). An intake port 4 and an exhaust port 5 open to the combustion chamber 3 and are respectively provided with an intake valve 6 and an exhaust valve 7.

Intake air is introduced into the combustion chambers 6 through an intake passage comprising a common passage portion 10 opening to the atmosphere by way of an air cleaner (not shown), a surge tank 9 connected to the downstream end of the common passage portion 10 and first to fourth discrete passage portions 8 branching from the surge tank 9 and respectively connected to the first to fourth cylinders 2. The surge tank 9 extends substantially in parallel to the crankshaft (not shown). Each discrete passage portion 8 is upwardly bowed along the the engine body 1 toward the surge tank 9, and the discrete passage portions 8 are substantially equal to each other in length. A throttle valve 11 is provided in the common passage portion 10 and a fuel injection valve 12 is provided in each discrete passage portion 8 near the downstream end thereof.

An interconnecting passage 14 is connected to the discrete passage portions 8 at intermediate portions thereof and is communicated with the respective discrete passage portions 8 by way of communicating openings 13, whereby the discrete passage portions 8 are mutually communicated. The discrete passage portions 8 are substantially equal to each other in the length between the communicating opening 13 and the cylinder 2.

Each communicating opening 13 is provided with an on-off valve 15 to close the communicating opening 13 in the low engine speed range lower than a predetermined engine speed and to open the same in the high engine speed range not lower than the predetermined engine speed. That is, the on-off valves 15 are fixed to a valve shaft 16 which extends in the direction of the cylinder row and is driven by an actuator 20. The actuator 20 is controlled by a control circuit 21 which receives an rpm signal from an engine speed detecting means (not shown). The on-off valves 15 may be operated to close the communicating openings 13 only when the engine load is heavy and the engine speed is high, and may be kept closed or open when the engine load is light.

The surge tank 9, the upstream side portions 8a of the discrete passage portions 8, and the upper portion of the interconnecting passage 14 are integrally formed to form an upper part 17a of an intake manifold 17, and the downstream side portions 8b of the discrete passage portions 8 and the lower portion of the interconnecting passage 14 are integrally formed to form the remaining part of the lower part 17b of the intake manifold 17. The upper part 17a and the lower part 17b are connected together to form the intake manifold 17. This arrangement is advantageous for compactly forming the whole intake system. Each discrete passage portion 8 is oval in cross section with the major axis extending in the direction of the cylinder row. The length L1 of the longer side at the upstream side portion 8a (upstream of the junction of the discrete passage portion with the interconnecting passage 14) is shorter than the length L2 of the major axis at the downstream side portion 8b, and accordingly, the cross-sectional area of the discrete passage portion 8 is smaller in the upstream side portion 8a (S2) than in the downstream side portion 8b (S1). The cross-sectional area S1 of the downstream side portion 8b is selected so that the flow speed of intake air becomes about 100 m/sec at an engine speed corresponding to the maximum engine output power (e.g., 6000 rpm), and the cross-sectional area S2 of the upstream side portion 8a is selected so that the flow speed of intake air becomes about 120 m/sec at the same engine speed.

When the on-off valves 15 are closed, the negative pressure wave generated upon initiation of each intake stroke in each combustion chamber propagated through the discrete passage portion corresponding thereto to the surge tank 9 and is reflected at the surge tank 9 as a positive pressure wave toward the combustion chamber. The overall length of each discrete passage portion is selected so that the period of the oscillation of the pressure wave in the intake passage can be matched with the period of opening and closure of the intake valve 6 to enhance the inertia effect of intake air in the low engine speed range. On the other hand, when the on-off valves 15 are opened, the negative pressure wave generated upon initiation of each intake stroke is reflected at the interconnecting passage 14 so that the distance over which the negative pressure wave and the reflected wave travel is shortened, that is effective length of the discrete passage portion is shortened, and accordingly the period of the oscillation of the pressure wave in the intake passage can be matched with the period of opening and closure of the intake valve 6 in the high engine speed range to enhance the inertia effect of intake air. At the same time, the inertia effect of intake in each discrete passage portion is further enhanced by the pressure waves propagated from the other discrete passage portions through the interconnecting passage 14.

Further, since the upstream side portion 8a of each discrete passage portion 8 is throated, the flow speed of intake air is increased to further improve the volumetric efficiency in the low engine speed range in which the interconnecting passage 14 is closed and intake flows solely through the discrete passage portions 8. On the other hand, in the high engine speed range, since the interconnecting passage 14 is opened and intake air is introduced into each cylinder 2 through the discrete passage portions 8 leading to the other cylinders, the influence of the throated upstream side portion 8a of the discrete passage portion 8 on the intake resistance is cancelled and high volumetric efficiency in the high engine speed range can be maintained.

Figure 7:
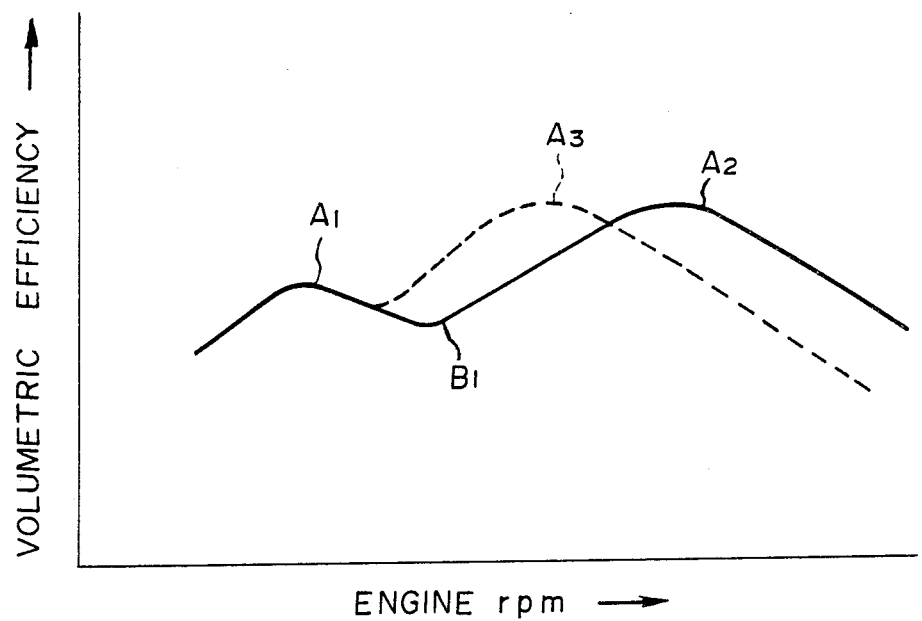
FIG. 7 is a graph for illustrating the effect of the invention.

In FIG. 7, the solid line shows the engine speed-volumetric efficiency characteristics of the engine provided with the intake system disclosed in Japanese Unexamined patent publication No. 59(1984)-275487, that is, one in which the discrete passage portions are uniform in the cross-sectional area over the entire length thereof. As can be understood from the solid line, the engine speed-volumetric efficiency characteristic curve has two peaks A1 and A2 at a low engine speed and a high engine speed, respectively and a valley B1 at an intermediate engine speed. The existence of the valley B1 is undesirable. In the engine provided with the intake system in accordance with the present invention, the peak A2 at a high engine speed is moved toward the lower engine speed side to form a peak A3 shown by the dotted line in FIG. 7, whereby reduction of the volumetric efficiency at intermediate engine speed can be restrained. If the cross-sectional area of the discrete passage portions 8 are narrowed over the entire length thereof, the intake resistance is increased in the high engine speed range to adversely affect the volumetric efficiency, that is, the height of the peak A2 will be lowered.

Though in the embodiment described above, the upper wall portion of the interconnecting passage 14 is defined by the inner wall portion of the upper part 17a of the intake manifold 17, the upper wall portion of the interconnecting passage 14 may be defined by a gasket 22 sandwiched between the upper part 17a and the lower part 17b of the intake manifold 17 as shown by dotted line in FIG. 1.

I claim:

1. An intake system for a multi-cylinder internal combustion engine comprising an intake passage including a common passage portion opening to the atmosphere, a surge tank connected to the downstream end of the common passage portion and a plurality of discrete passage portions branching from the surge tank and respectively connected to the cylinders, and at least one interconnecting passage means for communicating each of the discrete passage portions with at least one of the other discrete passage portions at a portion downstream of the surge tank; and a control means for closing the interconnecting passage means in a low engine speed range and for opening the interconnecting passage means in a high engine speed range, the effective cross-sectional area of each of the discrete passage portions being smaller in a portion upstream of a junction of the discrete passage portion with the interconnecting passage means than in a portion downstream thereof; the downstream portion of each of the discrete passage portions between the interconnecting passage means and the cylinder having a predetermined length such that an air inertia effect occurs at the high engine speed range, and the discrete passage portions having a selected length from the surge tank to the cylinder such that an air inertia effect is obtained at the low engine speed range;

the control means closing the interconnecting passage means at the low engine speed range so as to introduce intake air solely through the discrete passage portions, while at the high engine speed range intake air is introduced through both the discrete passage portions and the interconnecting passage means;

a negative pressure wave generated upon initiation of an intake stroke being reflected at the surge tank as a positive pressure wave at the low engine speed range, and said negative pressure wave being reflected at the interconnecting passage means at the high engine speed range.

2. A intake system as defined in claim 1 in which said discrete passage portions are oval in cross section with the longer axes extending in the direction of the cylinder row.

3. An intake system as defined in claim 1 in which said surge tank, upstream side portions of the discrete passage portions and an upper portion of the interconnecting passage means are integrally formed to form an upper part of an intake manifold and downstream side portions of the discrete passage portions and the lower portion of the interconnecting passage means are integrally formed to form the remaining part of the lower part of the intake manifold, the upper part and the lower part being connected together to form the intake manifold.

4. An intake system as defined in claim 1 in which said discrete passage portions are of substantially the same lengths.

5. An intake system as defined in claim 4 in which the discrete passage portions are substantially equal to each other in the length between the junction of the interconnecting passage with the discrete passage portion and the corresponding cylinder.

6. An intake system as defined in claim 1 in which said discrete passage portions are bowed upward above the engine body and are connected to the surge tank extending in the direction of the cylinder row.

7. An intake system as defined in claim 6 in which said interconnecting passage means is formed integrally with the surge tank on the lower side of the surge tank and on the inner side of the discrete passage portions.

8. An intake system for a multi-cylinder internal combustion engine comprising an intake passage including a common passage portion opening to the atmosphere, a surge tank connected to the downstream end of the common passage portion and a plurality of discrete passage portions branching from the surge tank and respectively connected to the cylinders, and at least one interconnecting passage means for communicating each of the discrete passage portions with at least one of the other discrete passage portions at a portion downstream of the surge tank; and a control means for closing the interconnecting passage means in a low engine speed range and for opening the interconnecting passage means in a high engine speed range, the effective cross-sectional area of each of the discrete passage portions being smaller in a portion upstream of a junction of the discrete passage portion with the interconnecting passage means than in a portion downstream thereof;

the downstream portion of each of the discrete passage portions between the interconnecting passage means and the cylinder having a predetermined length such that an air inertia effect occurs at the high engine speed range, and the discrete passage portions having a selected length from the surge tank to the cylinder such that an air inertia effect is obtained at the low engine speed range;

the control means closing the interconnecting passage means at the low engine speed range so as to introduce intake air solely through the discrete passage portions, while at the high engine speed range intake air is introduced through both the discrete passage portions and the interconnecting passage means;

a negative pressure wave generated upon initiation of an intake stroke being reflected at the surge tank as a positive pressure wave at the low engine speed range, and said negative pressure wave being reflected at the interconnecting passage means at the high engine speed range;

the flow speed of intake air at the downstream side portion of the discrete passage portion being approximately 100 m/sec at an engine speed corresponding to the maximum engine output power, and the flow speed of intake air at the upstream side portion of the discrete passage portion being approximately 120 m/sec at the same engine speed.

* * * * *